(12) United States Patent
Berbert et al.

(10) Patent No.: US 12,391,028 B2
(45) Date of Patent: Aug. 19, 2025

(54) RECYCLABLE FILMS AND PACKAGING

(71) Applicant: AMCOR FLEXIBLES NORTH AMERICA, INC., Neenah, WI (US)

(72) Inventors: Otacilio T. Berbert, Oshkosh, WI (US); Zheng Tian, Neenah, WI (US); Desmond J. VanHouten, Appleton, WI (US); Thomas A. Schell, Winneconne, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 1049 days.

(21) Appl. No.: 17/262,185

(22) PCT Filed: Sep. 7, 2018

(86) PCT No.: PCT/US2018/050054
§ 371 (c)(1),
(2) Date: Jan. 21, 2021

(87) PCT Pub. No.: WO2020/050860
PCT Pub. Date: Mar. 12, 2020

(65) Prior Publication Data
US 2021/0291503 A1    Sep. 23, 2021

(51) Int. Cl.
*B32B 27/32* (2006.01)
*B29C 48/00* (2019.01)
(Continued)

(52) U.S. Cl.
CPC .......... *B32B 27/32* (2013.01); *B29C 48/0018* (2019.02); *B29C 48/022* (2019.02);
(Continued)

(58) Field of Classification Search
CPC ... B29C 48/0018; B29C 48/022; B29C 48/21; B29C 48/91; B29K 2023/06;
(Continued)

(56) References Cited

U.S. PATENT DOCUMENTS

| 4,093,692 A | 6/1978 | Hill |
| 4,351,876 A | 9/1982 | Doi et al. |

(Continued)

FOREIGN PATENT DOCUMENTS

| EP | 1857270 | 11/2007 |
| WO | 9604178 A1 | 2/1996 |

(Continued)

OTHER PUBLICATIONS

Vadhar et al., Effects of Mixing on Morphology, Rheology, and Mechanical Properties of Blends of Ultra-High Molecular Weight Polyethylene With Linear Low-Density Polyethylene; Polymer Engineering and Science, vol. 27, No. 3 (Feb. 1987), p. 202-210.
(Continued)

*Primary Examiner* — Yan Lan

(57) ABSTRACT

A recyclable film contains a base film of polyethylene that has been oriented, annealed, and irradiatively crosslinked, and a sealant. The base film has a free shrink rate of less than 10% in both the machine direction and the transverse direction when exposed to heat of 90° C. These recyclable films are ideal for use as packaging components that can be hermetically heat sealed to themselves or other packaging components, while maintaining low shrink and excellent appearance.

17 Claims, 3 Drawing Sheets

(51) Int. Cl.
*B29C 48/21* (2019.01)
*B29C 48/91* (2019.01)
*B32B 27/08* (2006.01)
*B32B 27/30* (2006.01)
*B32B 27/34* (2006.01)
*B65D 65/40* (2006.01)
*B29L 7/00* (2006.01)
*B29L 31/00* (2006.01)

(52) U.S. Cl.
CPC .............. *B29C 48/21* (2019.02); *B29C 48/91* (2019.02); *B32B 27/08* (2013.01); *B32B 27/306* (2013.01); *B32B 27/34* (2013.01); *B65D 65/40* (2013.01); *B29K 2023/06* (2013.01); *B29L 2007/008* (2013.01); *B29L 2031/712* (2013.01); *B32B 2250/242* (2013.01); *B32B 2255/10* (2013.01); *B32B 2255/26* (2013.01); *B32B 2307/31* (2013.01); *B32B 2307/514* (2013.01); *B32B 2307/748* (2013.01); *B32B 2435/02* (2013.01)

(58) Field of Classification Search
CPC ......... B29L 2007/008; B29L 2031/712; B65D 65/40; B32B 1/00; B32B 2250/02; B32B 2250/24; B32B 2250/242; B32B 2255/10; B32B 2255/26; B32B 2270/00; B32B 2272/00; B32B 2307/30; B32B 2307/31; B32B 2307/40; B32B 2307/4023; B32B 2307/406; B32B 2307/412; B32B 2307/514; B32B 2307/518; B32B 2307/70; B32B 2307/72; B32B 2307/732; B32B 2307/736; B32B 2307/748; B32B 2307/75; B32B 2435/00; B32B 2435/02; B32B 2439/02; B32B 2439/60; B32B 2439/70; B32B 2439/80; B32B 27/00; B32B 27/08; B32B 27/30; B32B 27/302; B32B 27/306; B32B 27/32; B32B 27/327; B32B 27/34; B32B 7/06; B32B 7/12
See application file for complete search history.

(56) References Cited

U.S. PATENT DOCUMENTS

| | | |
|---|---|---|
| 5,846,620 A | 12/1998 | Compton |
| 6,086,988 A | 7/2000 | Van Beek |
| 6,187,397 B1 * | 2/2001 | Grangette ........... C08L 23/0815 428/218 |
| 2002/0197425 A1 * | 12/2002 | Wolf ....................... B29C 48/08 428/203 |
| 2009/0130408 A1 | 5/2009 | Mathe |
| 2011/0281996 A1 | 11/2011 | Golba |
| 2012/0033901 A1 | 2/2012 | Votaw |
| 2014/0004301 A1 | 1/2014 | Cloutier et al. |
| 2016/0339663 A1 | 11/2016 | Clare |
| 2018/0079188 A1 | 3/2018 | Grefenstein et al. |
| 2018/0345633 A1 | 12/2018 | Yuno et al. |

FOREIGN PATENT DOCUMENTS

| | | |
|---|---|---|
| WO | 199836903 A1 | 8/1998 |
| WO | 1998036903 A1 | 8/1998 |
| WO | 2016128865 A1 | 8/2016 |
| WO | 2016135213 A1 | 9/2016 |
| WO | 2017120340 A1 | 7/2017 |
| WO | 2017184633 A1 | 10/2017 |
| WO | 2018004558 A1 | 1/2018 |
| WO | 2018042299 A1 | 3/2018 |
| WO | 2019083675 | 5/2019 |
| WO | 2019132954 | 7/2019 |

OTHER PUBLICATIONS

International Search Report of PCT/US2018/050054, issued on Jan. 19, 2019, 5 pages.

* cited by examiner

RECYCLABLE FILMS AND PACKAGING

TECHNICAL FIELD

The present disclosure is related to recyclable films that can be used for high performance packaging applications. Specifically, the disclosed films have improved heat resistance and are recyclable in the polyethylene recycling stream without the requirement to incorporate additional compatibilizer.

BACKGROUND

Many consumers and consumer goods packagers desire to use recyclable food packaging. In some cases, recyclable packaging structures are desirable for compliance purposes. Today, high performance packaging typically uses oriented polyethylene terephthalate (OPET) or biaxially-oriented nylon (BON) for outer layers, which provide high stiffness, printing quality and heat resistance. Without any additional compatibilizing chemicals, however, both OPET and BON are not recyclable in current recycling streams.

It is understood that a polyethylene structure is a way to provide recyclable films. Polyethylene structures typically have low stiffness and limited heat resistance. The completed packages tend to fall short of the expected characteristics for high performance packaging. Poor heat resistance and durability results in poor appearance due to shrinking and scuffing. Barrier performance may not meet expectations due to lack of high barrier materials and poor heat seals causing non-hermetic packaging. To improve the performance of polyethylene structures, some polyethylene films of the prior art are oriented but continue to exhibit drawbacks with respect to heat resistance and stiffness.

There is a continuing need for films that are recyclable while also providing excellent mechanical properties and heat resistance to meet the demands of high performance packaging.

SUMMARY

Provided are recyclable films and packages made therefrom. The recyclable films disclosed herein provide excellent mechanical properties and heat resistance. Recyclable films that are oriented and irradiatively cross-linked show improved properties with respect to heat resistance, clarity, and shrinkage as compared to films of the same compositions that are not both oriented and irradiatively cross-linked.

Described herein are recyclable films that include a base film of polyethylene, and a sealant. The base film has been oriented, annealed and irradiatively cross-linked and has a free shrink rate of less than 10% in the machine direction and a free shrink rate of less than 10% in the transverse direction upon application of heat up to 90° C.

The base film of some embodiments has a clarity of at least 85%. The base film of some embodiments has a free shrink rate of less than 5% in the machine direction and less than 5% in the transverse direction upon application of heat up to 90° C. In some embodiments the base film composition consists of high density polyethylene, medium density polyethylene, low density polyethylene, linear low density polyethylene, or combinations thereof.

Due to the irradiative cross-linking, the outer surface of the base film displays a logarithmic plot of the apparent shear viscosity of the base film versus apparent shear rate, of data points measured at 10 logarithmically spaced data points from 1 $s^{-1}$ to 100,000 $s^{-1}$ shear rate, that is a substantially straight line. Additionally, the recyclable film has improved heat resistance, which can be observed when the onset of sticking by the outer surface of the base film upon exposure to heat sealing conditions is at least 5 to 15° C." higher than a comparative outer surface of a comparative film having the same materials that is not irradiatively cross-linked.

The base film may be coextruded and have a medium density polyethylene layer positioned between an outer high density polyethylene layer and an inner high density polyethylene layer. Additionally, the outer and inner high density polyethylene layers of the base film further have linear low density polyethylene.

In some embodiments, the sealant of the recyclable film is an extruded film made of polyethylene, polyethylene copolymers or blends thereof. In other embodiments the sealant is a heat seal coating.

The sealant may contain an ethylene vinyl acetate copolymer and may have a heat seal initiation temperature lower than 250° F.

In some embodiments, the sealant is an extruded film. In a specific embodiment, the recyclable film has a sealant that contains an ethylene vinyl alcohol copolymer or polyamide, and a polar polymer compatibilizer. The recyclable film may also have printed indicia.

A package may be formed using any embodiment of the recyclable films. The package is formed by the recyclable film being heat sealed to itself or another packaging component, and the heat seal may be manually openable. In some cases, the heat seal strength is between about 200 g/in and 2,500 g/in when measured according to ASTM F88.

One embodiment of a package for a product has a lid made from a recyclable film, and the lid is connected to a tray or cup by a peelable heat seal. In some embodiments, the tray or cup comprises polyester, polyethylene, polypropylene, coated paper, polystyrene, glass, ceramic or aluminum.

Also disclosed herein is a method of making a package. The method includes extruding a polyethylene to form a base film, orienting the base film in a machine direction, annealing the base film, irradiating the base film, thereby forming cross-links in at least an outer surface of the base film, connecting the base film to a sealant, and forming the package by heat sealing.

BRIEF DESCRIPTION OF THE DRAWINGS

The disclosure may be more completely understood in consideration of the following detailed description of various embodiments of the disclosure in connection with the accompanying drawings, in which.

Figure 1:
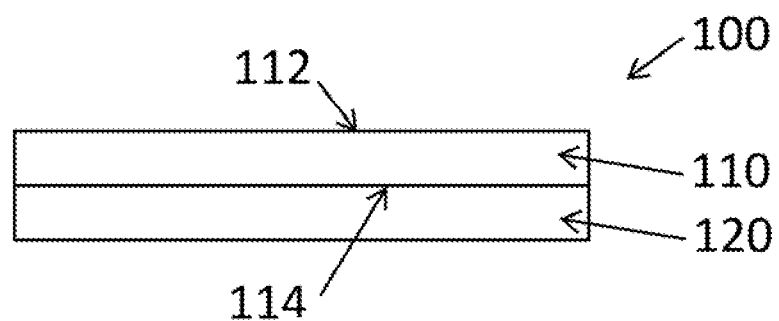
FIG. 1 is a cross-sectional view of an exemplary recyclable film.

The drawings show some but not all embodiments. The elements depicted in the drawings are illustrative and not necessarily to scale, and the same (or similar) reference numbers denote the same (or similar) features throughout the drawings.

DETAILED DESCRIPTION

Films of the present disclosure are recyclable and provide improved heat resistance and clarity. The recyclable films are oriented and irradiatively cross-linked. The recyclable films exhibit limited shrinkage upon exposure to heat sealing conditions. Higher heat resistance of the disclosed films allows for better converting on existing heat sealing machines. It is understood that there is an approximate 15° F. (~10° C.) variation of any given commercial heat sealing process due to variability of the thermostats that control heat bars of the heat sealing machines. The greater heal resistance of the disclosed recyclable films can tolerate the heat bar temperature variability better than current recyclable films. The improvements in the disclosed recyclable films allow for use in high performance packaging applications.

A "layer" as used herein refers to a building block of films that is a structure of a single material type or a blend of materials. A layer may be a single polymer, a blend of materials within a single polymer type or a blend of various polymers, may contain metallic materials and may have additives. Layers may be continuous with the film or may be discontinuous or patterned.

Reference to "outer surface" or "outer layer" or "outer film" as used herein refers to the portion of a film or layer that is intended to be oriented toward the exterior of a package when the film is used as a packaging film.

Reference to an "inner surface" or "inner layer" as used herein refers to the surface or layer of the film that is oriented opposite of the outer surface or outer layer. In other words, "inner" refers to the orientation away from the outer surface and towards the package interior where the product is packaged.

An "interior layer" as used herein refers to a layer that is not exposed to handling and the environment. Interior layers may provide functionality as needed for particular applications. Interior layers may provide barrier protection and/or structural strength. An exemplary interior layer is a barrier layer, which provides protection to packaged food for freshness and/or a barrier to moisture and/or oxygen. Barrier layers may also protect outer films/layers from migration from package contents (for example, oils and the like). An exemplary interior layer may also be a structural layer, which provides one or more of: general durability, thermoformability, puncture strength, resistance to curling, and flex crack resistance.

A "sealant" is a material that seals to itself or another film or packaging component to form a hermetic seal. That is, the sealant comprises a thermoplastic polymer or polymer mixture that softens when exposed to heat and returns to its original condition when cooled to room temperature. A "sealant film" has at least one exposed sealant layer that is sealable to itself or another packaging component to form a hermetic seal. As used herein, the term "hermetic" is used in reference to packages that have been sealed completely and tightly. A hermetic package is one that has no leaks in the seals or other obvious passageways through the package enclosing a product.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith. As used herein, the term "copolymer" refers to polymers formed by the polymerization reaction of at least two different monomers.

Polyethylene is the name for a polymer whose basic structure is characterized by the chain —(CH2-CH2-)$_n$. As used herein, the term "polyethylene" includes homopolymers and copolymers of ethylene. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

There are several broad categories of polymers and copolymers referred to as "polyethylene." Placement of a particular polymer into one of these categories of polyethylene is frequently based upon the density of the polyethylene and often by additional reference to the process by which it was made since the process often determines the degree of branching, crystallinity and density. In general, the nomenclature used is nonspecific to a compound but refers instead to a range of compositions. This range often includes both homopolymers and copolymers.

"High density polyethylene" (HDPE) is ordinarily used in the art to refer to both (a) homopolymers of densities between about 0.960 to 0.970 g/cm3 and (b) copolymers of ethylene and an α-olefin (usually 1-butene or 1-hexene) which have densities between 0.940 and 0.958 g/cm$^3$. HDPE includes polymers made with Ziegler or Phillips type catalysts and is also said to include high molecular weight polyethylene.

"Medium density polyethylene" (MDPE) typically has a density from 0.928 to 0.940 g/cm3. Medium density polyethylene includes linear medium density polyethylene (LMDPE).

Another grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms.

"Linear low density polyethylene" (LLDPE) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well-known variations of LLDPEs). An LLDPE produced with a metallocene or constrained geometry catalyst is often referred to as "mLLDPE".

Other examples of polyethylene copolymers include, but are not limited to, ethylene vinyl acetate copolymer (EVA), ethylene methyl methacrylate copolymer (EMMA), ethylene-methacrylic acid (EMAA) and ethylene acrylic acid (EAA).

The term "tie layer," "adhesive", "adhesive layer," or "adhesive coating," refers to a material placed on one or more layers, partially or entirely, to promote the adhesion of that layer to another surface. Preferably, adhesive layers or coatings are positioned between two layers of a multilayer film to maintain the two layers in position relative to each other and prevent undesirable delamination. Unless otherwise indicated, a tie layer, an adhesive layer or a coating can have any suitable composition that provides a desired level of adhesion with the one or more surfaces in contact with the adhesive layer material.

As used herein, the term "cross-linking" refers to the chemical reaction which results in the formation of bonds between polymer chains, such as, but not limited to, carbon-carbon bonds. Cross-linking may be accomplished by use of a chemical agent or combination of chemical agents which may include, but is not limited to, peroxide, silanes and the like. Alternatively or additionally, cross-linking may be accomplished by use of exposure to ionizing radiation, which may include, but is not limited to, high energy electron beam, gamma-rays, beta particles and ultraviolet radiation. The irradiation source may be an electron beam generator operating in a range of about 150-6000 kilovolts (6 megavolts) with a power output capable of supplying the desired dosage. The voltage can be adjusted to appropriate levels which may be, for example, 1-6 million volts or higher or lower. Many irradiation units for films are known to those skilled in the art. In general, the most preferred amount of radiation is dependent upon the film structure and its total thickness. One method for determining the degree of "cross-linking", e.g., "cross-link density" or the amount of radiation effect is to measure the "gel content." As used herein, the term "gel content" refers to the relative extent of cross-linking within a polymeric material. Gel content is expressed as a relative percent (by weight) of the polymer having formed insoluble carbon-carbon bonds between polymers and may be determined by ASTM D-2765-01 Test Method, which is incorporated herein by reference in its entirety. Another method for determining the relative degree of cross-linking is with capillary viscometry. The apparent shear viscosity of the polymer is measured with respect to the apparent shear rate of the polymer. This measure is representative of the relative degree of cross-linking as it is known that viscosity increases as the level of cross-linking increases. The capillary viscometry test method is further described herein.

Base Films

Recyclable films, as well as packages and/or containers including such films, preferably have seal strength, stability, heat resistance, and oxygen and water vapor transmission properties that allow them to be subjected to heat sealing conditions without loss of desired functional characteristics. Recyclable films that contain base films that are oriented and irradiatively cross-linked show improved properties with respect to heat resistance, clarity, shrinkage and overall performance as compared to films of the same compositions that are not oriented and irradiatively cross-linked.

The base film of the recyclable film may be monolayer or multilayer. When the base film is monolayer, it preferably includes HDPE.

When the base film is multilayered, preferably a combination of at least a HDPE layer and a MDPE layer is used. In an embodiment, the multilayered base film has the following design: HDPE/MDPE/HDPE. In another embodiment, the multilayered base film has the following design: HDPE-mLLDPE/MDPE/HDPE-mLLDPE. In an embodiment, the multilayered base film has the following design: HDPE/LMDPE/HDPE. In another embodiment, the multilayered base film has the following design: HDPE-mLLDPE/LMDPE/HDPE-mLLDPE.

In one or more embodiments, the base films are 100% polyethylene. The base films may have a composition that is selected from the group consisting of: high density polyethylene, medium density polyethylene, low density polyethylene, linear low density polyethylene, and combinations thereof. The base films may consist essentially of polyethylene homopolymers of one or more densities. The base films may consist essentially of polyethylene homopolymers, polyethylene copolymers, or blends thereof. The base films may consist of polyethylene homopolymers of one or more densities. The base films may consist of polyethylene homopolymers, polyethylene copolymers, or blends thereof. The base films may consist of polyethylene homopolymers or copolymers with other materials, such as, but not limited to adhesive, printed indicia and other additives, such that the other materials are collectively less than 5% of the overall weight of the base film.

The base film may be fabricated by any known process or combination of processes. The initial fabrication step should include some form of polyethylene extrusion. Extrusion may be monolayer or multilayer. Multilayer may be achieved through a single coextrusion process, or successive extrusion lamination or extrusion coating operations. Extrusion may be performed on dies that are annular, flat or any other configuration.

A typical blown film process may be utilized to extrude the base film. The resultant annular tube may be collapsed upon itself while still warm, creating a single palindromic structure. Alternatively, the tube can be slit and wound onto two separate rolls. Prior to slitting and winding the films, the film may be oriented and annealed in line, using monoaxial or biaxial orientation in a double or triple bubble process, as is known in the art. Alternatively, the processes of orientation and annealing may be done in an off-line process. Irradiative crosslinking may also be completed either in-line with extrusion or off-line.

The base film may be extruded in a flat die configuration. In this case, the film may be oriented, annealed and irradiated, either in-line or off-line. Orientation may be machine direction only, transverse direction only, or biaxial orientation. When stretching the film in a machine direction orientation (MDO) process, orientation of 2 to 8 times is typical, depending on the film formulation and properties required.

After orientation, the base film should be annealed to reduce the amount of shrink the film will have at lower temperatures. Annealing is typically accomplished in-line through high diameter rollers set up at temperatures a few degrees lower than the melting point of the polymer or blend of polymers present in the film. However, annealing can be done by any known means including hot air or IR heating. Reducing the shrink is advantageous for further converting (i.e. printing or laminating) and to improve the appearance of the recyclable film when it is heat sealed in a packaging operation. The base film may have a machine direction shrink rate of 10% or less than 10% upon application of heat less than or equal to 90° C."; or less than 9%, less than 8%, less than 7%, less than 6%, less than 5%, less than 4%, less than 3%, less than 2%, or less than 1%. The base film may have a transverse direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. Preferably, the base film has a machine direction shrink rate of less than 7% and a transverse direction shrink rate of less than 1%, when exposed to heat less than or equal to 90° C. Preferably, the base film has a machine direction shrink rate of less than 5% and a transverse direction shrink rate of less than 5%, when exposed to heat less than or equal to 90° C. The base film may have a shrink rate of less than 2% in the machine direction and 0% in the transverse direction when exposed to heat of 90° C. The base film may have a shrink rate of less than 1% in the machine direction and 0% in the transverse direction when exposed to heat of 90° C.

The films may be exposed to an electron beam treatment to achieve the irradiative crosslinking for improved heat resistance. Exposure to irradiation can be on one side of the film, typically the side of the film that will form the outer surface of the package. However, treatment can occur on either side or both sides. The irradiation may affect the polymers (i.e. crosslink the polymers) throughout the entire film thickness or the irradiation may only affect a portion of the film. The irradiating by electron beam is conducted under conditions of about 2 to about 24 MRad, or any values in between. Conditions for electron beam irradiation may be in the range of about 5 to 20 MRad, or preferably about 9 MRad. Sufficient crosslinking is evidence by improved heat resistance of the film and by viscosity testing of the outer surface of the film as described herein.

Irradiative crosslinking of the film may occur either before or after orientation of the base film. There is some indication that better quality films result from crosslinking the film prior to orientation. However, crosslinking before or after orientation is suitable for the base film.

The base film may have a thickness of between 0.5 mil and 3.0 mil.

The base film may have a clarity of more than 85% or 90%. Ideally, the base film should have a clarity of at least 95%, at least 95.5%, at least 96%, at least 96.5%, at least 97%, at least 97.5%, at least 98%, at least 98.5%, at least 99%, at least 99.5%, or 100%, and all values there between, when measured in accordance with the instructions and teachings of ASTM D-1003-13. Clarity is defined as the percentage of transmitted light that deviates from the incident light by less than 2.5 degrees. The clarity of the base film can be affected by material selection and orientation conditions, as is known in the art. For instance, it is generally known that machine direction orientation of HDPE films to a level of 4-5× will significantly improve the clarity over films that have had less orientation. Alternatively, the base film could be opaque or have any transparency level in between high clarity and opaque.

The base films may have the surfaces treated for various reasons. Corona treatment may be applied to either surface of the base film as may be needed for printing or adhesive lamination. Surface coatings may be added to enhance the slip properties of the exterior surface. Other coatings and treatments may be added to the base film or recyclable film without restriction.

Sealants

Recyclable films for fabricating packages may include any base film disclosed herein. The base film may be used as an outer film of the multilayer films for packaging to provide heat resistance during heat sealing. The recyclable films for packaging may be without limit, 2-ply, 3-ply, or more, include multiple base films.

A sealant may be coextruded with the base film or, preferably, is connected to a base film to form the recyclable film. A sealant may be a film that is manufactured by a process such as, but not limited to, blown film extrusion, and may comprise polyethylene, polyethylene copolymers or blends thereof. One preferable copolymer for sealants is ethylene vinyl acetate copolymer.

The sealant may be a material applied as a heat seal coating. Heat seal coatings are typically thin and may be pattern applied. Many different types of heat seal coatings can be used without hindering the recyclability of the film. Heat seal coatings may be, but are not limited to, polyester based formulas, vinyl/acrylic copolymer based formulas, or polypropylene based formulas. Heat seal coatings may contain low melt temperature components such as waxes.

The sealant may be monolayer or multilayer. In the case of multilayer material, the surface layer or more than one layer may be intricately involved in sealing. If the sealant is multilayer, it may contain any other materials as long as they do not frustrate the recycling intent for the combined recyclable film. For example, the sealant may contain a barrier layer of ethylene vinyl alcohol copolymer or polyamide (neither of which are typically recyclable in a polyethylene recycling stream) along with a material that is capable of compatibilizing the polymers, thus making the entire film recyclable according to this disclosure.

The sealant material should be capable of forming a bond upon exposure to heat and pressure for a short dwell time, a process commonly known as heat sealing. When the recyclable film is exposed to the sealing conditions, the outer base layer must be heat resistant such that the recyclable film does not shrink or otherwise distort. Additionally, the sealant material must soften and seal at a relatively low temperature. In other words, when making the heat seal, the heat resistant base film should have high heat resistance as compared to the temperature at which the sealant is capable of making a seal, such that there is an operating window in which the seals can be made without compromising the appearance or other performance properties of the recyclable film.

Heat seal coatings that contain wax components may have heat seal initiation temperatures of 60° C. or even lower. Extruded metallocene polyethylene based sealants may have heat seal initiation temperatures of 85° C., or even lower. The sealant on the recyclable film may have a heat seal initiation temperature that is less than 60° C., 85° C., 100° C. or less than 121° C.

For some packaging applications, it may be required that the sealant create a seal that is peelable. As used herein, the term "peelable seal" is one that can be opened manually (i.e. by hand). Peelable seals are generally defined by the packaging industry as seals that can be separated by a force of less than 2.500 g/in when measured by ASTM F88. In most packaging applications, a peel strength with a lower limit of about 200 g/in is necessary to ensure that the package does not open too easily, causing accidental opening during handling or distribution. The recyclable films used as packaging may have seal strength less than 2,000 g/in, less than 1,500 g/in, less than 1,000 g/in, or less than 500 g/in.

In some cases, the general composition of the sealant will dictate that the seal is peelable. In other cases, the sealant may be a multilayer film that has several layers that rupture and delaminate to create the peel mechanism, as is known in the art. The peelable feature of this disclosure can be made by any known means.

Between the sealant and the base film, any number of optional interior layers may be provided. For example, there may be an adhesive layer, printed indicia, or barrier layers between the sealant and the base film. The sealant and any further interior layers can be made from recyclable materials in order to form an entire film that is considered recyclable.

Recyclable Films

The base films may be used as an outer layer in a multilayer film to fabricate recyclable packages. Recyclable films include an outer base film connected to a sealant. The sealant may be connected by any known method including, but not limited to, coextrusion, extrusion coating, extrusion lamination, adhesive lamination or coating.

In general, the term recyclable means that the product is suitable for reuse. An example of one specific context of recyclable is reusing a plastic grocery bag a second time to contain some other items. The plastic bag has been reused and recycled. In a slightly different context, recyclable means that the product is suitable for reuse after being converted into a new product. As used herein, the term "recyclable" is meant to indicate that the film can be converted into a new useful item, by means of reprocessing in a polyethylene waste stream. Reprocessing may entail washing, separating, melting and forming, among many other steps. Typically when plastic packaging is reprocessed, the material is mechanically chopped into small pieces and then melted to be reformed into the new product. If multiple incompatible materials are present in the packaging, interactions occur during reprocessing causing gels, brittle material, poor appearance and generally un-usable or poor quality products. Using the term "recyclable" indicates that these drawbacks are generally not present. Qualification as a recyclable material is not regulated by any specific agencies, but can be obtained from specific groups such as Trex® and How2Recycle™. Recyclable films disclosed herein may be suitable for "Store Drop-off" recycling streams. These streams may accept the following: 100% polyethylene bags, wraps, and films; very close to 100% polyethylene bags, wraps, and films that have passed recyclability tests by Trex®, and How2Recycle-approved polyethylene-based carrier packing with or without compatibilizer technology. Introduction of a recyclable film into any of these recycling-by-reprocessing avenues should not require additional compatibilizer.

In one or more embodiments, the recyclable films are 100% polyethylene. The recyclable films may have a composition that is selected from the group consisting of: high density polyethylene, medium density polyethylene, low density polyethylene, linear low density polyethylene, and combinations thereof. The recyclable films may consist essentially of polyethylene homopolymers of one or more densities. The recyclable films may consist essentially of polyethylene homopolymers, polyethylene copolymers, or blends thereof. The recyclable films may consist of polyethylene homopolymers of one or more densities. The recyclable films may consist of polyethylene homopolymers, polyethylene copolymers, or blends thereof. The recyclable films may consist of polyethylene homopolymers or copolymers with other materials, such as, but not limited to adhesive, printed indicia and other additives, such that the other materials are collectively less than 5% of the overall weight of the recyclable film.

The irradiative crosslinking treatment of, for example, an outer surface of the recyclable film leads to improved properties relative to a recyclable film with a comparative outer surface of a comparative film that is not oriented and irradiatively cross-linked. For example, the recyclable films are improved such that onset of sticking by an outer surface of the film upon exposure to heat sealing conditions is at least 5 to 15° C. higher than a comparative outer surface of a comparative outer film comprising the polyethylene that is not oriented and irradiatively cross-linked. The improvement may be at least 6° C., 7° C., 8° C., 9° C., 10° C., 11° C., 12° C., 13° C., 14° C., or 15° C. higher.

The recyclable films may be used as-formed to fabricate packages. When the recyclable films are used to fabricate packages, the inner surface of the film is of a composition or treated to be a sealant. Printing of the recyclable films may be on the outer surface. For multilayered recyclable films, printing may be on either side of the base film.

A packaging component, such as a lid, can be formed from a recyclable film as disclosed herein or a multilayered film that includes the recyclable film. In general terms, there is at least a base film and a sealant. Optionally, one or more interior (or barrier) layers may be present between the outer layer or film and the sealant layer.

Between any of the layers, an adhesive coating or layer may be provided to provide adhesion and continuity between the layers. Adhesive compositions of the disclosure may include, but are not limited to: modified and unmodified polyolefin, preferably polyethylene, most preferably, ethylene/α-olefin copolymer, modified and unmodified acrylate resin, preferably selected from the group consisting of ethylene/vinyl acrylate copolymer, ethylene/ethyl acrylate copolymer, ethylene/butyl acrylate copolymer, or blends thereof. EVA is an ethylene/vinyl acetate co-polymer, which may be used in particular to form a layer to facilitate bonding of polymerically dissimilar layers.

Packaging

The recyclable films disclosed herein may be used for many purposes, but are especially useful for high performance packaging applications. The recyclable films may be used in a portion of the package or as the entire package.

To form a package, a sealing layer of any film disclosed herein is adhered to itself or another packaging component to form a seam of a package. The recyclable films described herein may be heat sealed to other films to make packages such as pouches, stand-up pouches, flow wrap, liners, sachets or bags. The recyclable films may take the form of a lid that is sealed to a rigid, semi-rigid or flexible thermoformed component such as a tray or cup. Packages may further include other components such as labels, zippers or fitments.

It is of common use in many forms of packaging to use heat seals to combine packaging components to form packages. In some cases, packaging materials are sealed to themselves. In some cases, packaging materials are sealed to other packaging components. Packaging components can include, but are not limited to, flexible films, rigid or semi-rigid films, thermoformed pockets such as trays or cups, injection molded items such as fitments, zippers, patches, etc. Hermetic packaging can be formed from one, two, three or more different packaging components.

Hermetic packaging is critical for a wide variety of products, including foods, beverages, pharmaceuticals, consumer goods and other sensitive products. Hermetic packaging can help prevent damage to the product. For many products, achieving good heat seals to create consistently hermetic packages is highly critical. An advantage of the recyclable films disclosed herein is that they are more heat resistant and thus can be formed into hermetic packaging on a more reliable basis. The combination of the high heat resistance of the outer polyethylene base film and the sealant layers that provide quality seals is an important advantage to the films presented herein.

It is also an advantage of some embodiments of the recyclable films disclosed herein that they are provided with sealants that achieve peelable seals when heat sealed to other packaging components. Packages can be opened by consumers in a number of ways, including peeling open manually. Peelable seals are those that can be peeled open by a consumer by hand, without the use of another tool. A consumer can grasp two parts of a package and pull the package open at a heat seal. Peelable seals allow for the product within the package to be easily accessed by the consumer. In some cases, peelable seals can also be manually reclosed and resealed.

The recyclable films may have peelable heat seals also allow for easy separation of the packaging components. This advantageously allows for proper disposal of the packaging components into other recycling streams or waste streams.

If the packaging includes a tray or cup, the tray or cup may be of any convenient material. Generally, materials used for these types of packaging components include polyester, polyethylene, polypropylene, coated paper, polystyrene, glass, ceramic or aluminum. The tray or cup may be of a single material, a blend of materials, or may have a layered structure, including many different materials in combination. The lid and the tray should each have materials on their surface that are conducive to heat sealing to form a hermetic seal. For example, the lidding sealant may be an EVA heat seal coating that will seal under heat and pressure to an aluminum tray. In another embodiment, the lidding has a sealant that incorporates a polyethylene sealant that can be heat sealed to a polyethylene based sealing surface on a cup.

The lidding structure, the lidding sealant and the tray or cup need to be designed such that the lid can be heat sealed to the tray or cup 1) without causing damage to the exterior of the lid (shrinking, marring, sticking, etc.) and 2) creating a hermetic seal between the lidding and the tray or cup. Ideally, the seal between the lidding and the tray or cup is manually peelable. That is, while the seal is initially hermetic, a person can partially or fully remove the lid from the tray or cup by separating the packaging components with their fingers.

Packaging made from the recyclable films described herein is suitable for containment of many goods, including those sensitive to oxygen and moisture, or other applications where long shelf life is desired. Products advantageously packaged in the recyclable films include, but are not limited to, fresh foods, frozen foods, shelf stable foods, medications, pharmaceuticals, nutraceuticals, supplements, cosmetics, pet foods, chemicals, medical devices, shampoo, cleaners, baby wipes and any other products typically packaged in high performance packaging.

Before describing several exemplary embodiments of the disclosure, it is to be understood that the disclosure is not limited to the details of construction or process steps set forth in the following description. The disclosure is capable of other embodiments and of being practiced or being carried out in various ways.

Turning to the figures, FIG. 1 is a cross-sectional view of an exemplary recyclable film 100 having a composition that is polyethylene-based, without restriction. The embodiment of FIG. 1 includes a base film 110 and a sealant 120. The composition of the base film 110 may comprise a single type of polyethylene, for example HDPE. The composition of base film 110 may comprise a blend of types of polyethylene, for example HDPE and mLLDPE. The base film 110 has a first surface 112 and a second surface 114. The first surface 112 forms an outer surface of a final package. To enable making a package out of recyclable film 100, second surface 114 has a sealant 120 adjacently positioned. The sealant 120 is capable of making a hermetic heat seal with itself or another packaging component. Printed indicia may be provided on outer surface 112 (surface printing) or inner surface 114 (i.e. reverse printing or trap printing). The surfaces of the base film are optionally corona-treated. Further, adhesive or other material layers may be located between the second surface 114 and the sealant 120.

Figure 2:
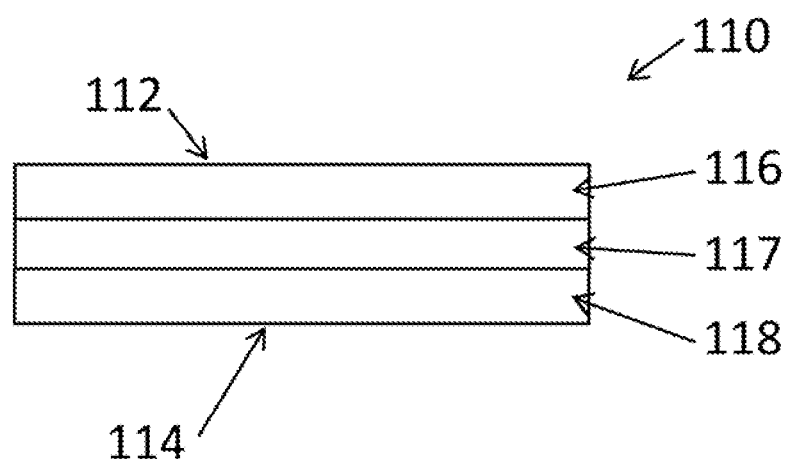
FIG. 2 is a cross-sectional view of an exemplary base film of a recyclable film.

FIG. 2 is a cross-sectional view of an exemplary base film 110. The base film of FIG. 2 is multilayer, which is a coextrusion of individual sources of polymer resins or blends of resins. Base film 110 has an outer layer 116, a middle layer 117, and an inner layer 118. The composition of each layer is independently polyethylene-based, without restriction. In a non-limiting embodiment, base film 110 comprises an outer layer 116 of HDPE, a middle layer 117 of MDPE, and an inner layer 118 of HDPE. In another non-limiting embodiment, base film 110 comprises an outer layer 116 of HDPE and mLLDPE blend, a middle layer 117 of MDPE, and an inner layer 118 of HDPE and mLLDPE blend. The base film 110 has a first surface 112 and a second surface 114. Middle layer 117 is optional. Any number of additional layers may be provided between inner layer 118 and outer layer 116. In one or more embodiments, layers 116 and 118 may have the same composition different from that of 117. Printed indicia may be provided on surface 112, which is optionally corona-treated. Reverse printed indicia may be provided on surface 114, which is optionally corona-treated, which is opposite surface 112 of outer layer 116.

Figure 3:
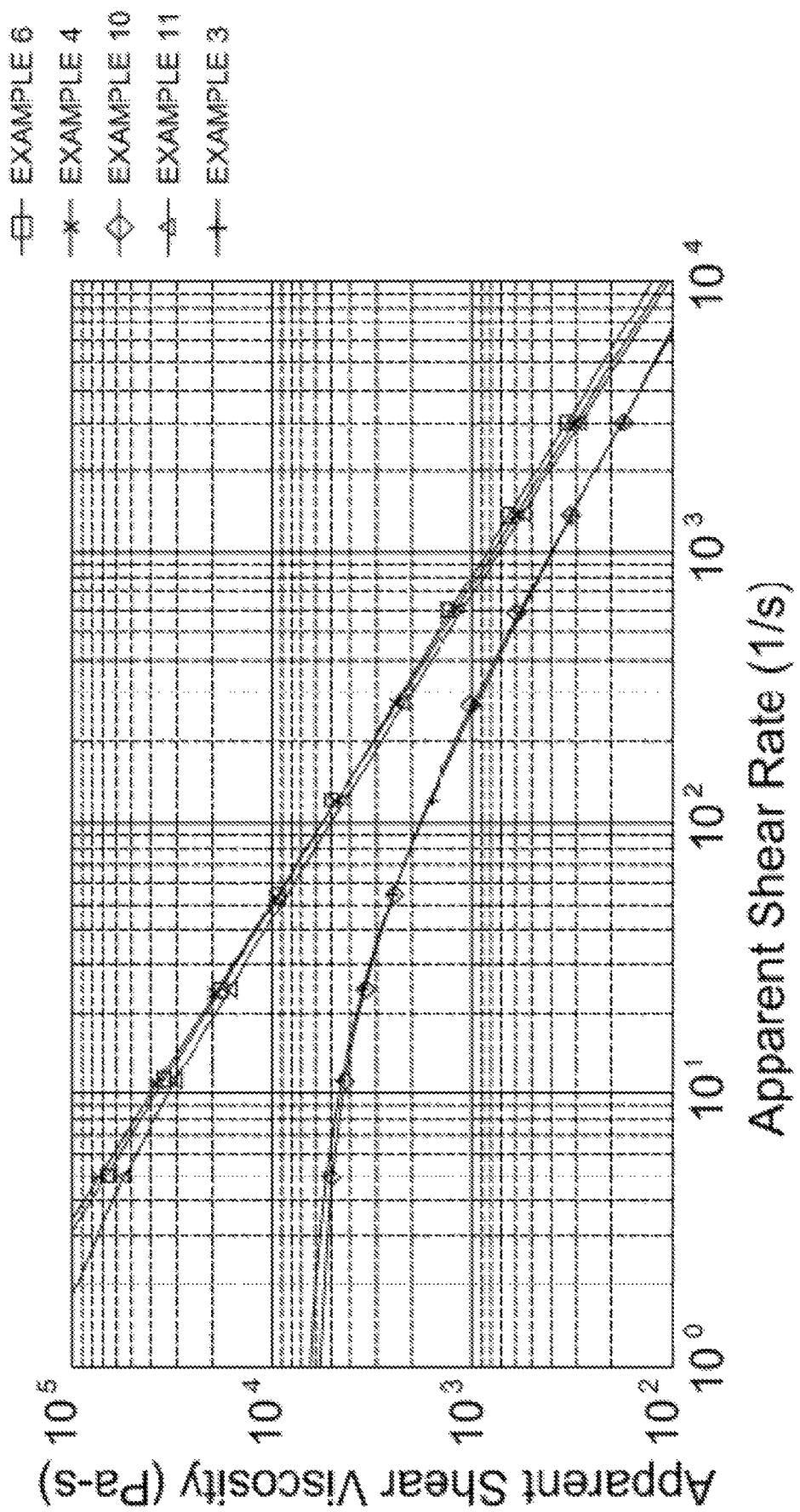
FIG. 3 is a logarithmic graph of gel density comparison by viscosity.

FIG. 3 provides a graphical representation of gel density by comparison of the slope of a line depicting the logarithmic change in apparent shear viscosity over apparent shear rate. Crosslinking is evidenced by a substantially constant change (slope) over a range of 1 $s^{-1}$ to 100,000 $s^{-1}$. The plotted data represent examples of exemplary films and comparative films, as explained in the EXAMPLES section herein.

Figure 4A:
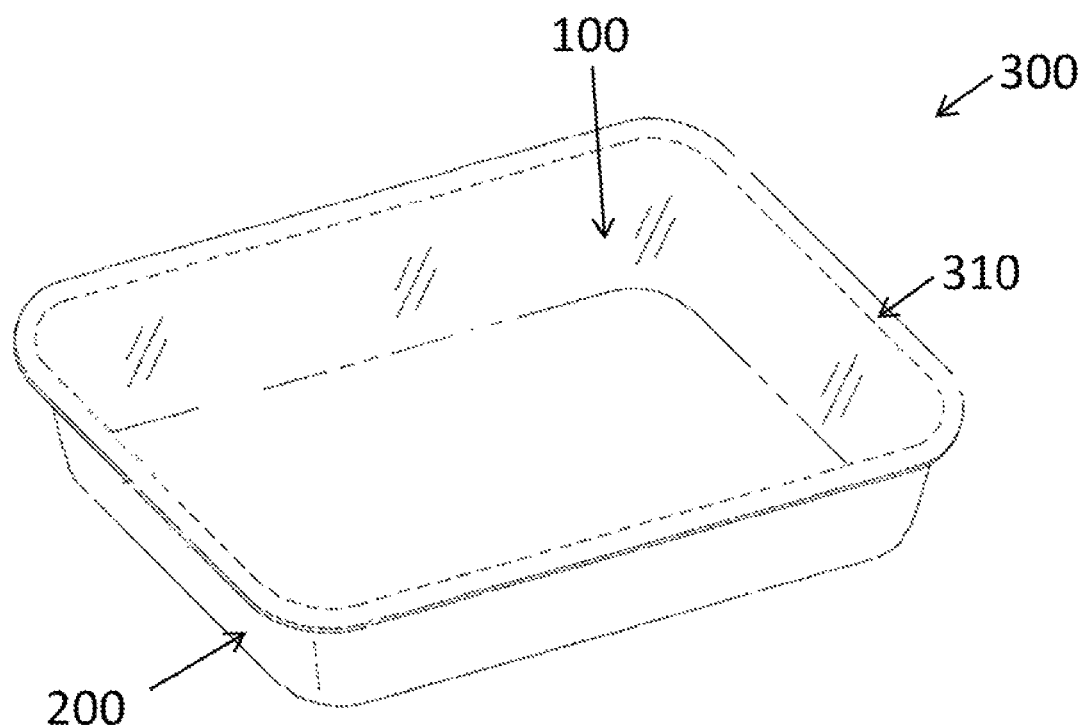
FIGS. 4a and 4b are views of exemplary packaging incorporating a recyclable film.
Figure 4B:
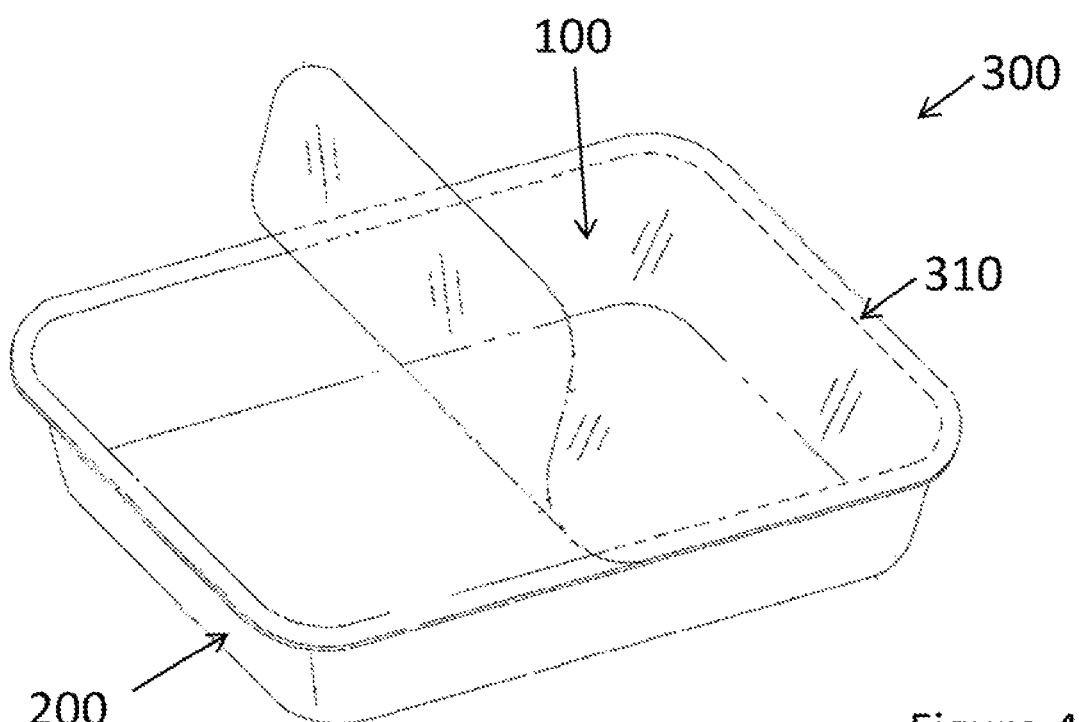

Packages made using an embodiment of a recyclable film disclosed herein are shown in FIGS. 4a and 4b. The exemplary packages 300 include a tray 200 connected to a lid made of a recyclable film 100 via a heat seal 310 at the periphery of the packaging components. Ideally, the package is hermetically sealed. In FIG. 4b, package 300 is shown after the lid 100 has been manually peeled away from the tray 200, allowing access to the product therein.

EXAMPLES

The following steps were used in the fabrication process of films of Examples 1-6 and 10-11. A resin corresponding to each layer was extruded through a die and the layers were coextruded. Coextruded blown films were slit and wound to make two finished rolls.

In the examples, HDPE-mLLDPE refers to a blend of high density polyethylene and metallocene-catalyzed linear low density polyethylene resins. HDPE refers to a high density polyethylene. MDPE refers to a medium density polyethylene.

MDO refers to stretching films in a machine direction orientation.

EB refers to electron beam treatment of the film.

Example 1

Comparative

A 3-layer film structure of HDPE-mLLDPE/MDPE/HDPE-mLLDPE was stretched by MDO and was not exposed to EB treatment. Blown film thickness was 156 micron (6.25 mil), printing surface was corona-treated, and the MDO ratio was 6:1. Caliper measurement of the MDO film thickness was 31.0 micron (1.24 mils).

Example 2

A 3-layer film structure of HDPE-mLLDPE/MDPE/HDPE-mLLDPE was first exposed to EB treatment (9 MRad) and then stretched by MDO.

Example 3

Comparative

A 3-layer film structure of HDPE/MDPE/HDPE was stretched by MDO and was not exposed to EB treatment. Blown film thickness was 156 micron (6.25 mil), printing surface was corona-treated, and the MDO ratio was 6:1. Caliper measurement of the MDO film thickness was 22.1 micron (0.89 mils).

Example 4

A 3-layer film structure of HDPE/MDPE/HDPE was first exposed to EB treatment (9 MRad) and then stretched by MDO.

Example 5

A 3-layer film structure of HDPE-mLLDPE/MDPE/mLLDPE was first stretched by MDO and then was exposed to EB treatment (9 MRad). Blown film thickness was 156 micron (6.25 mil), printing surface was corona-treated, and the MDO ratio was 6:1. Caliper measurement of the MDO film thickness was 30.8 micron (1.23 mils).

Example 6

A 3-layer film structure of HDPE/MDPE/HDPE was stretched by MDO and was exposed to EB treatment (9

MRad). Blown film thickness was 156 micron (6.25 mil), printing surface was corona-treated, and the MDO ratio was 6:1. Caliper measurement of the MDO film thickness was 26.3 micron (1.05 mils).

Example 7

Comparative

A film of biaxially oriented polypropylene (BOPP) was obtained and not treated by exposure to EB treatment.

Example 8

Comparative

A film of oriented polyethylene terephthalate (OPET) was obtained, which was not exposed to EB treatment. Caliper measurement of the film thickness was 11.8 micron (0.47 mils).

There is no an EXAMPLE 9.

Example 10

Comparative

A 3-layer film structure of HDPE/MDPE/HDPE was not exposed to either EB treatment nor stretched by MDO.

Example 11

A 3-layer film structure of HDPE/MDPE/HDPE was only exposed to EB treatment (9 MRad) but not stretched by MDO.

Testing

Tables 1A and 1B provide a summary of the thermal stability/heat sealability of the films of Examples 1-7. The initial heat seal test temperature was 240° F. (115° C.) (at 40 PSI, 1 sec). The temperature was increased in 5 degree increments and the pressure and dwell time were held constant. The film was visually observed at each temperature after being exposed to the heat bar.

TABLE 1A

| Temp. ° F. (° C.) | Example 1 COMPARATIVE HDPE-mLLDPE/MDPE/HDPE-mLLDPE MDO, no EB | Example 2 HDPE-mLLDPE/MDPE/HDPE-mLLDPE BB followed by MDO | Example 3 COMPARATIVE HDPE/MDPE/HDPE MDO, no EB | Example 4 HDPE/MDPE/HDPE EB followed by MDO |
|---|---|---|---|---|
| 240 (115) | Start sticking | Good | Good | Good |
| 245 (118) | Sticking, shrink | Good | Good | Good |
| 250 (121) | Sticking, shrink | Shrink | Start sticking | Good |
| 255 (124) | Sticking, shrink | Start sticking, shrink | Sticking | Good |
| 260 (127) | X | X | Sticking | Good |
| 265 (129) | X | X | Sticking, shrink | Start sticking |
| 270 (132) | X | X | Sticking, shrink | Sticking, shrink |
| 275 (135) | X | X | X | X |
| 280 (138) | X | X | X | X |

TABLE 1B

| Temp. ° F. (° C.) | Example 5 HDPE-mLLDPE/MDPE/HDPE-mLLDPE MDO followed by EB | Example 6 HDPE/MDPE/HDPB MDO followed by EB | Example 7 BOPP |
|---|---|---|---|
| 240 (115) | Good | Good | Good |
| 245 (118) | Good | Good | Good |
| 250 (121) | Good | Good | Good |
| 255 (124) | Good | Good | Good |
| 260 (127) | Tiny shrink | Good | Sticking |
| 265 (129) | Shrink | Good | Sticking, shrink |
| 270 (132) | Shrink, hazy | Good | Sticking, shrink |
| 275 (135) | Shrink, bazy | Shrink | Sticking, shrink |
| 280 (138) | Shrink, hazy | Sticking, shrink | Sticking, shrink |

Sticking = material sticks to heat bar when heat bar is released; sample can be pulled away from heat bar without material remaining stuck to heat bar.
X = failure; material sticks to heat bar even after sample is pulled away from the heat bar.
Shrink = wrinkling; film deformation.
Hazy = visual detection of haze in film FIG. 3 is a logarithmic graph of gel density comparison by viscosity, showing apparent shear viscosity (Pa-s) versus apparent shear rate (s-1) for Examples 4, 6, and 11; and comparative Examples 3 and 10. For Examples 4, 6 and 11, the change in apparent shear viscosity is substantially constant over an apparent shear rate in the range of $1 \text{ s}^{-1}$ to $100{,}000 \text{ s}^{-1}$. For the films that have not had an EB treatment (comparative Examples 3 and 10), the change in apparent shear rate is not constant between an apparent shear rate of $1 \text{ s}^{-1}$ and $100{,}000 \text{ s}^{-1}$ (i.e. the slope of the curve is not constant, the curve is not a line). Among the EB treated films (4, 6, and 11), there was not a significant difference in cross-linking when order of treatment is changed (4 vs 6) or in the absence of MDO (11).

The crosslink density comparison by viscosity was determined by capillary viscometry. The capillary viscometry was conducted by using a Dynisco Capillary Rheometer, Model LCR 7000, available from Dynisco Polymer Test, Franklin, MA, USA. The LabKARS software package was used to collect the data. Die number CX400-20 was used at a temperature of 190° C. with approximately 10 g of film loaded into the charging barrel. A melt time of 6 minutes was used before data was collected. Data was then collected at 9 different shear rate points that ranged from 5 reciprocal seconds (1/s) to 3000 reciprocal seconds (1/s). The shear rate points were logarithmically spaced within this range. An additional data point was collected after the first 9 data points to ensure that polymer degradation did not occur with the samples. The additional data point was collected at the same shear rate as data point 5. None of the samples demonstrated any polymer degradation as the additional data point showed similar shear viscosity as that collected at data point 5. The 10 shear rate points that were used, in this order, were: 5, 11.1, 24.7, 55.1, 122.5, 272.5, 606.2, 1348.5, 3000, and 122.5. The software calculated the shear viscosity at the inputted shear rate points.

For loop stiffness measurement, an Instron® tensile tester from Instron Corporation, Norwood, Massachusetts was used having a 100-pound (approximately 45.36 kilogram) load cell. Specimen samples were prepared by cutting a 4 inch (10.16 cm) by 4 inch (10.16 cm) sample of each material and folding opposing ends of the sample towards themselves to form a loop. The folded sample was placed into a specimen holding fixture so that the opposing sides of the sample were separated by a distance of 1.0 inch (2.54 cm). A 0.25 inch (0.635 cm) thick by 5 inch (12.7 cm) long stainless steel test probe was fitted to an Instron® mechanical testing instrument. The instrument was set to the "stiffness" internal protocol. The amount of force required to bend or deflect the sample approximately 0.5 inch (1.27 centimeter) at the vertex of the loop was measured.

Results for loop stiffness are provided in Table 2.

TABLE 2

|  | MD[A] | | TD[B] | |
|---|---|---|---|---|
| Example | Thickness micron (mils) | Loop Stiffness grams | Thickness micron (mils) | Loop Stiffness grams |
| Example 8 COMPARATIVE OPET | 10.9 (0.44) | 1 ± 0.13 | 11.6 (0.46) | 0.9 ± 0.07 |
| Example 1 COMPARATIVE HDPE-mLLDPE/ MDPE/HDPE-mLLDPE MDO, no EB | 33.0 (1.32) | 3.1 ± 0.46 | 30.6 (1.22) | 3.4 ± 0.68 |
| Example 5 HDPE-mLLDPE/ MDPE/HDPE-mLLDPE MDO followed by EB | 30.7 (1.23) | 2.9 ± 0.34 | 30.0 (1.20) | 2.2 ± 0.43 |
| Example 3 COMPARATIVE HDPE/MDPE/HDPE MDO, no EB | 21.3 (0.85) | 2.3 ± 0.43 | 22.9 (0.92) | 1.4 ± 0.33 |
| Example 6 HDPE/MDPE/HDPE MDO followed by EB | 26.8 (1.07) | 2.8 ± 0.44 | 26.4 (1.06) | 2.2 ± 0.33 |
| Example 4 HDPE/MDPE/HDPE EB followed by MDO | — | 3.3 ± 0.41 | — | 3.1 ± 0.29 |
| Example 2 HDPE-mLLDPE/ MDPE/HDPE-mLLDPE EB followed by MDO | — | 3.3 ± 0.38 | — | 3.2 ± 0.31 |

[A]Machine Direction
[B]Transverse Direction

Based on Table 2, the loop stiffness of the inventive treated films are improved over the comparative OPET. When films are first treated with EB followed by MDO, the films display higher stiffnesses than films first oriented then exposed to EB.

Force was derived from Secant & Young's Modulus, which was measured by ASTM D882-12. Tensile strength was measured by ASTM D882-12. Elmendorf Tear was measured by ASTM D1922-15. Instron Puncture was measured by ASTM F1306-16. The data is provided in Table 3.

TABLE 3

| Example | Tensile Strength Newton | Film Puncture Newton | Elmendorf Tear, Newton | Resistance Force Newton |
|---|---|---|---|---|
| Example 8 COMPARATIVE OPET | MD: 51.15; TD: 45.81 | 19.19 | MD: 0.1568; TD: 0.1764 | MD: 1288; TD: 1245 |
| Example 5 HDPE-mLLDPE/ HDPE-mLLDPE MDO followed by EB | MD: 74.02; TD: 18.41 | 3.75 | MD: 0.1764; TD: 1.0878 | MD: 1559; TD: 1053 |
| Example 6 HDPE/MDPE/HDPE MDO followed by EB | MD: 29.84; TD: 13.16 | 6.44 | MD: 0.4312; TD: 0.196 | MD: 997; TD: 784 |
| Example 4 HDPE/MDPE/HDPE EB followed by MDO | MD: 93.37; TD: 19.39 | 8.33 | MD: 0.8428; TD: 1.793 | MD: 1546; TD: 1055 |
| Example 2 HDPE-mLLDPE/MDPE/ HDPE-mLLDPE EB followed by MDO | MD: 106.49; TD: 21.52 | 9.87 | MD: 1.421; TD: 5.3508 | MD: 1164; TD: 1218 |

Clarity was measured using the clarity port of a BYK-Gardner HazeGard in accordance with its instructions and the teaching of ASTM D-1003-13. Clarity is defined as the percentage of transmitted light that deviates from the incident light by less than 2.5 degrees.

Table 4 provides clarity data.

TABLE 4

| Example | Clarity |
|---|---|
| Example 8 COMPARATIVE OPET | 97.2% |
| Example 1 COMPARATIVE HDPE-mLLDPE/MDPE/ HDPE-mLLDPE MDO, no EB | 96.8% |
| Example 5 HDPE-mLLDPE/MDPE/HDPE-mLLDPE MDO followed by EB | 95.0% |
| Example 3 COMPARATIVE HDPE/MDPE/HDPE MDO, no EB | 95.4% |
| Example 6 HDPE/MDPE/HDPE MDO followed by EB | 96.6% |

"Free shrink" is defined to be values obtained by measuring unrestrained shrink at 90° C. for five seconds. Four test specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen for each direction. The machine direction shrinkage for the four specimens is averaged for the machine direction shrinkage value of the given film sample, and the transverse direction shrinkage for the four specimens is averaged for the transverse direction shrinkage value.

With respect to Examples 2, 4, 5 and 6, shrinkage in the machine direction in 90° C. water bath was about 7-8%. There was no shrinkage in the transverse direction.

Unless otherwise indicated, all numbers expressing quantities of ingredients, properties such as thickness, force, loop stiffness, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

EMBODIMENTS

A. A recyclable film comprising:
a base film comprising polyethylene, the base film being oriented, annealed and irradiatively cross-linked, and
a sealant,
wherein the base film has a free shrink rate of less than 10% in the machine direction and a free shrink rate of less than 10% in the transverse direction upon application of heat up to 90° C.

B. A recyclable film according to any other recyclable film embodiment wherein the base film has a clarity of at least 85%.

C. A recyclable film according to any other embodiment wherein the base film has a free shrink rate of less than 5% in the machine direction and less than 5% in the transverse direction upon application of heat up to 90° C.

D. A recyclable film according to any other recyclable film embodiment wherein the base film composition consists of high density polyethylene, medium density polyethylene, low density polyethylene, linear low density polyethylene, or combinations thereof.

E. A recyclable film according to any other recyclable film embodiment wherein a logarithmic plot of the apparent shear viscosity of the base film versus apparent shear rate, of data points measured at 10 logarithmically spaced data points from $1 \text{ s}^{-1}$ to $100,000 \text{ s}^{-1}$ shear rate, results in a substantially straight line.

F. A recyclable film according to any other recyclable film embodiment wherein onset of sticking by an outer surface of the base film upon exposure to heat sealing conditions is at least 5 to 15° C. higher than a comparative outer surface of a comparative film comprising the same materials that is not irradiatively cross-linked.

G. A recyclable film according to any other recyclable film embodiment wherein the base film is coextruded and comprises a medium density polyethylene layer positioned between an outer high density polyethylene layer and an inner high density polyethylene layer.

H. A recyclable film according to Embodiment G wherein the outer and inner high density polyethylene layers of the base film further comprise linear low density polyethylene.

I. A recyclable film according to any other recyclable film embodiment wherein the sealant is an extruded film comprising polyethylene, polyethylene copolymers or blends thereof.

J. A recyclable film according to any other recyclable film embodiment wherein the sealant comprises an ethylene vinyl acetate copolymer.

K. A recyclable film according to any other recyclable film embodiment wherein the sealant is a heat seal coating.

L. A recyclable film according to Embodiment K wherein the heat seal coating has a heat seal initiation temperature lower than 250° F.

M. A recyclable film according to any other recyclable film embodiment wherein the sealant is an extruded film comprising:
an ethylene vinyl alcohol copolymer or polyamide, and
a polar polymer compatibilizer.
N. A recyclable film according to any other recyclable film embodiment further comprising printed indicia.
O. A package for a product comprising the recyclable film of any of Embodiments A through N.
P. A package for a product, the package comprising a recyclable film according to any of Embodiments A through N, heat sealed to itself or another packaging component, wherein the heat seal is manually openable.
Q. A package for a product, the package comprising a recyclable film according to any of Embodiments A through N, heat sealed to itself or another packaging component, wherein the heat seal strength is between about 200 g/in and 2,500 g/in when measured according to ASTM F88.
R. A package for a product comprising:
a lid comprising a recyclable film according to any of Embodiments A through N,
a tray or cup, and
a peelable heat seal connecting the lid and the tray or cup.
S. A package according to Embodiment R wherein the tray or cup comprises polyester, polyethylene, polypropylene, coated paper, polystyrene, glass, ceramic or aluminum.
T. A method of making a package, the method comprising:
extruding a polyethylene to form a base film;
orienting the base film in a machine direction;
annealing the base film;
irradiating the base film, thereby forming cross-links in at least an outer surface of the base film;
connecting the base film to a sealant; and
forming the package by heat sealing.

What is claimed is:

1. A recyclable film comprising:
   a. a base film comprising a composition consisting of high density polyethylene, medium density polyethylene, low density polyethylene, linear low density polyethylene, or combinations thereof, the base film being oriented, annealed and irradiatively cross-linked, and
   b. a sealant,
   wherein the base film has a free shrink rate of less than 10% in the machine direction and a free shrink rate of less than 10% in the transverse direction upon application of heat up to 90° C., and the base film has a clarity of at least 85%.

2. A recyclable film according to claim 1 wherein the base film has a free shrink rate of less than 5% in the machine direction and less than 5% in the transverse direction upon application of heat up to 90° C.

3. A recyclable film according to claim 1 wherein a logarithmic plot of the apparent shear viscosity of the base film versus apparent shear rate, of data points measured at 10 logarithmically spaced data points from 1 s$^{-1}$ to 100,000 s$^{-1}$ shear rate, results in a substantially straight line.

4. A recyclable film according to claim 1 wherein onset of sticking by an outer surface of the base film upon exposure to heat sealing conditions is at least 5 to 15° C. higher than a comparative outer surface of a comparative film comprising the same materials that is not irradiatively cross-linked.

5. A recyclable film according to claim 1 wherein the sealant is an extruded film comprising polyethylene, polyethylene copolymers or blends thereof.

6. A recyclable film according to claim 1 wherein the sealant comprises a surface layer and the surface layer comprises an ethylene vinyl acetate copolymer.

7. A recyclable film according to claim 1 wherein the sealant is a heat seal coating.

8. A recyclable film according to claim 7 wherein the heat seal coating has a heat seal initiation temperature lower than 250° F.

9. A recyclable film according to claim 1 wherein the sealant is an extruded film comprising:
   a. an ethylene vinyl alcohol copolymer or polyamide, and
   b. a polar polymer compatibilizer.

10. A recyclable film according to claim 1 further comprising printed indicia.

11. A package for a product comprising the recyclable film of claim 1.

12. A package for a product, the package comprising a recyclable film according to claim 1, heat sealed to itself or another packaging component, wherein the heat seal is manually openable.

13. A package for a product, the package comprising a recyclable film according to claim 1, heat sealed to itself or another packaging component, wherein the heat seal strength is between about 200 g/in and 2,500 g/in when measured according to ASTM F88.

14. A package for a product comprising:
    a. a lid comprising a recyclable film according to claim 1,
    b. a tray or cup, and
    c. a peelable heat seal connecting the lid and the tray or cup.

15. A package according to claim 14 wherein the tray or cup comprises polyester, polyethylene, polypropylene, coated paper, polystyrene, glass, ceramic or aluminum.

16. A recyclable film comprising:
    a. a coextruded base film and comprising a medium density polyethylene layer positioned between an outer high density polyethylene layer and an inner high density polyethylene layer, the base film being oriented, annealed and irradiatively cross-linked, and
    b. a sealant,
    wherein the base film has a free shrink rate of less than 10% in the machine direction and a free shrink rate of less than 10% in the transverse direction upon application of heat up to 90° C., and the base film has a clarity of at least 85%.

17. A recyclable film according to claim 16 wherein the outer and inner high density polyethylene layers of the base film further comprise linear low density polyethylene.

* * * * *